C. Wolff.
Chain Propeller.
No. 93,384. Patented Aug. 3, 1869.
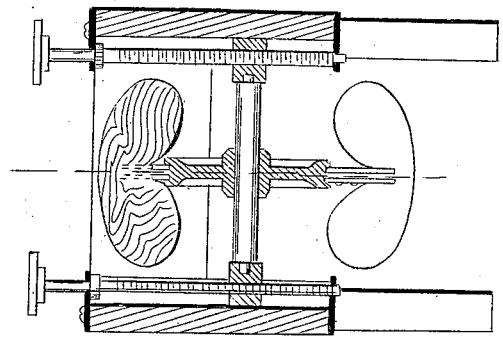
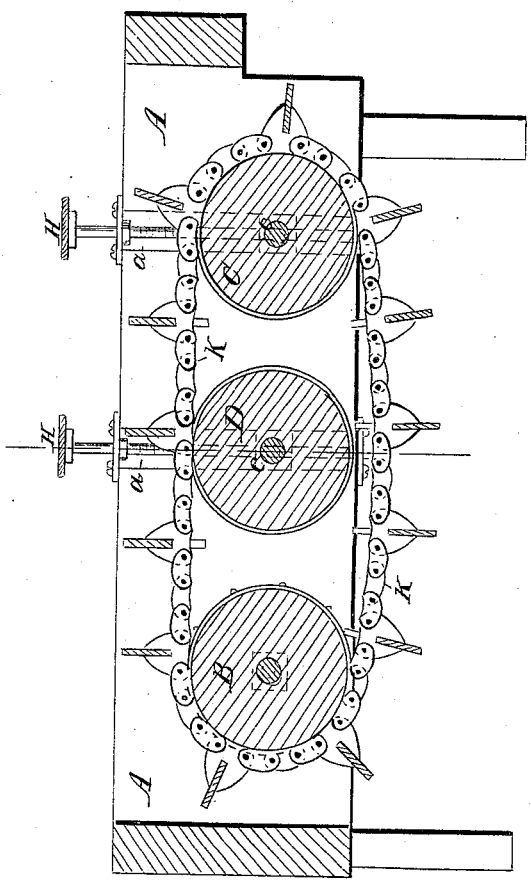
Witnesses
James P. Grover
J. B. Peyton
Inventor
Charles Wolff
Chipman, Hosmer & Co.
attys

United States Patent Office.

CHARLES WOLFF, OF WASHINGTON, DISTRICT OF COLUMBIA.

Letters Patent No. 93,384, dated August 3, 1869.

IMPROVEMENT IN PROPELLING-APPARATUS.

The Schedule referred to in these Letters Patent and making part of the same.

*To all whom it may concern:*

Be it known that I, CHARLES WOLFF, of Washington, in the county of Washington, and District of Columbia, have invented a new and valuable Improvement in Steamboat Paddle-Wheels; and I do hereby declare that the following is a full, clear, and exact description of the construction and operation of the same, reference being had to the annexed drawings, making a part of this specification, and to the letters and figures of reference marked thereon.

Figure 1, of the drawings, is a representation of a longitudinal section of my invention.

Figure 2 is a detail.

My invention relates to means for propelling vessels; and

It consists mainly in the construction and novel arrangement of devices, by which an endless-chain paddle-wheel is made effective and practically of use.

The letter A, of the drawings, represents the hull of a vessel, and

The letter B, a wheel arranged and revolving with a suitable shaft, as shown. It has teeth on its periphery, to receive and operate the links of the endless-chain hereinafter to be described.

The letter C represents a wheel, with a grooved periphery, adjusted and arranged as shown, and The letter D, a similar wheel, adjusted midway between the wheels B and C.

These wheels C and D are made adjustable at will, by the means following, namely:

I form grooves in the planks or studs, in which the shafts have their bearings in blocks, that are moved upward or downward, as may be desirable, by means of set-screws.

The grooves are marked *a*, the blocks, *c*, and the set-screws H, on the drawings.

The letter K represents the endless chain, the links of which are constructed and united in the manner shown, and adapted to move in the grooves of wheels C and D, and be actuated by the teeth on the periphery of wheel B.

The buckets of the wheel are of the form shown on fig. 2, with rounded corners, to save unnecessary strain upon any part thereof.

I am aware that devices for propelling vessels by means of an endless-chain paddle-wheel, have been made the subject of invention by other minds, but I am confident the means herein shown for adjusting such wheel so as to adapt it to the exigencies of rough or calm seas, and deep or shoal water, are novel and peculiar to my own invention.

I also believe that the construction of my chain, and its mode of operation upon the toothed periphery of wheel B, and the grooves of wheels C and D, are my own invention.

What I claim as my invention, and desire to secure by Letters Patent, is—

The grooves *a*, block *c*, and set-screws H, in combination with chain K, its buckets, as described, wheels B, C, and D, when the same are constructed and arranged substantially as and for the purposes set forth.

In testimony that I claim the above, I have hereunto subscribed my name, in the presence of two witnesses.

CHARLES WOLFF.

Witnesses:
JAMES P. GREVES,
J. B. PEYTON.